(12) United States Patent
Sivalingam et al.

(10) Patent No.: US 9,074,582 B2
(45) Date of Patent: *Jul. 7, 2015

(54) WIND TURBINE NACELLE WITH COOLER TOP

(75) Inventors: Krishnamoorthi Sivalingam, Singapore (SG); Anand Bahuguni, Singapore (SG); Ravi Kandasamy, Singapore (SG); Srikanth Narasimalu, Singapore (SG); John K. Grevsen, Viby J (DK); Jesper Nyvad, Egå (DK); Paul T. Tietze, Brabrand (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1010 days.

This patent is subject to a terminal disclaimer.

(21) Appl. No.: 13/146,577

(22) PCT Filed: Jan. 29, 2010

(86) PCT No.: PCT/DK2010/050024
§ 371 (c)(1),
(2), (4) Date: Nov. 18, 2011

(87) PCT Pub. No.: WO2010/085962
PCT Pub. Date: Aug. 5, 2010

(65) Prior Publication Data

US 2012/0061047 A1 Mar. 15, 2012

Related U.S. Application Data

(60) Provisional application No. 61/148,528, filed on Jan. 30, 2009.

(30) Foreign Application Priority Data

Jan. 30, 2009 (DK) .................................. 2009 00148

(51) Int. Cl.
*F03D 11/00* (2006.01)

(52) U.S. Cl.
CPC ............. *F03D 11/00* (2013.01); *F05B 2260/64* (2013.01); *Y02E 10/722* (2013.01); *Y02E 10/726* (2013.01)

(58) Field of Classification Search
USPC ........................................................ 415/177
See application file for complete search history.

(56) References Cited

U.S. PATENT DOCUMENTS

| 6,903,466 B1 | 6/2005 | Mercier et al. |
| 2001/0035651 A1 | 11/2001 | Umemoto et al. |

(Continued)

FOREIGN PATENT DOCUMENTS

| DE | 30 10 485 | 9/1981 |
| DE | 102 33 947 | 2/2004 |

(Continued)

OTHER PUBLICATIONS

Sven Nytoft Rasmussen, Ph.D.; 1st Technical Examination and Search Report issued in related Denmark Application No. PA 2009 00149; Sep. 15, 2009; 4 pages; Denmark Patent and Trademark Office.

(Continued)

*Primary Examiner* — Richard Edgar
(74) *Attorney, Agent, or Firm* — Wood, Herron & Evans, LLP (57) ABSTRACT

The present invention relates to a wind turbine nacelle having a top face with a longitudinal extension in a wind direction. The nacelle comprises a cooling device having a cooling area and extending from the first face of the nacelle, and a cover having at least one inner face and at least a front edge facing the wind direction. The cooling device is enclosed by the first face of the nacelle and the inner face of the cover and is arranged in a front distance of at least 440 mm from the front edge of the cover.

16 Claims, 6 Drawing Sheets

(56) References Cited

U.S. PATENT DOCUMENTS

| | | | |
|---|---|---|---|
| 2006/0113804 A1 | 6/2006 | Costin | |
| 2008/0247875 A1 | 10/2008 | Yoshida | |
| 2010/0061853 A1* | 3/2010 | Bagepalli | 416/95 |

FOREIGN PATENT DOCUMENTS

| | | |
|---|---|---|
| DE | 103 51 844 | 6/2005 |
| EP | 1 081 376 | 3/2001 |
| EP | 1 586 769 | 10/2005 |
| EP | 1 612 415 | 1/2006 |
| GB | 203 307 | 9/1924 |
| JP | 2005-83659 | 3/2005 |
| JP | 2008-247325 | 10/2008 |
| WO | 2008/131766 | 11/2008 |
| WO | 2009/033925 | 3/2009 |
| WO | 2009/115100 | 9/2009 |

OTHER PUBLICATIONS

Ulrich Gebker; International Search Report and Written Opinion issued in related International Application No. PCT/DK2010/05022; Feb. 3, 2011; 10 pages; European Patent Office.

Carsten Nielsen; 1st Technical Examination and Search Report issued in related Denmark Application No. PA 2009 00151; Sep. 14, 2009; 5 page; Denmark Patent and Trademark Office.

Ulrich Gebker; International Search Report and Written Opinion issued in related International Application No. PCT/DK2010/05023; Feb. 3, 2011; 10 pages; European Patent Office.

Sven Nytoft Rasmussen, Ph.D.; 1st Technical Examination and Search Report issued in priority Denmark Application No. PA 2009 00148; Sep. 15, 2009; 4 pages; Denmark Patent and Trademark Office.

Ulrich Gebker; International Search Report and Written Opinion issued in priority International Application No. PCT/DK2010/050024; Feb. 11, 2011; 11 pages; European Patent Office.

Carsten Nielsen; 1st Technical Examination and Search Report issued in related Denmark Application No. PA 2009 00150; Sep. 3, 2009; 4 pages; Denmark Patent and Trademark Office.

Ulrich Gebker; International Search Report and Written Opinion issued in related International Application No. PCT/DK2010/050025; Feb. 3, 2011; 10 pages; European Patent Office.

International Preliminary Report on Patentability (Chapter I of the Patent Cooperation Treaty); The International Bureau of WIPO, PCT/DK2010/050023, Aug. 2, 2011, 6 pgs.

International Preliminary Report on Patentability (Chapter I of the Patent Cooperation Treaty); The International Bureau of WIPO, PCT/DK2010/050022, Aug. 2, 2011, 6 pgs.

International Preliminary Report on Patentability (Chapter I of the Patent Cooperation Treaty); The International Bureau of WIPO, PCT/DK2010/050024, Aug. 2, 2011, 7 pgs.

International Preliminary Report on Patentability (Chapter I of the Patent Cooperation Treaty); The International Bureau of WIPO, PCT/DK2010/050025, Aug. 2, 2011, 6 pgs.

* cited by examiner

WIND TURBINE NACELLE WITH COOLER TOP

FIELD OF THE INVENTION

The present invention relates to a wind turbine nacelle having a first face with a longitudinal extension in a wind direction, comprising a cooling device having a cooling area and extending from the first face of the nacelle, and a cover having at least one inner face and at least a/one front edge facing the wind direction, the cooling device being enclosed by the first face of the nacelle and the inner face of the cover.

The present invention also relates to a wind turbine.

BACKGROUND ART

A wind turbine converts wind power into electrical energy by using a generator placed among other equipment in the nacelle of the wind turbine. When the generator converts energy, the walls and the air surrounding the equipment are heated and the equipment itself is thus heated, too.

When the equipment is heated, the efficiency with which the conversion occurs is substantially decreased. In order to cool the equipment, the walls and the air surrounding the equipment are cooled down by means of a heat sink positioned on top of the nacelle as shown in WO 2008/131766 A2. Thus, the cool outside air passes through the heat sink and cools a fluid within the heat sink which is subsequently used to cool the walls or the air surrounding the equipment.

However, such cooling constructions have shown not to be efficient enough to provide an optimal cooling of the walls and the air surrounding the equipment of the wind turbine nacelle.

SUMMARY OF THE INVENTION

It is an object of the present invention to wholly or partly overcome the above disadvantages and drawbacks of the prior art. More specifically, it is an object to provide an improved wind turbine nacelle which is able to cool the generator and other equipment inside the nacelle more efficiently than the solutions of the prior art.

The above objects, together with numerous other objects, advantages, and features, which will become evident from the below description, are accomplished by a solution in accordance with the present invention wherein the cooling device is arranged at a front distance of at least 440 mm from the front edge of the cover.

Arranging the cooling device with a front distance of at least 440 mm from the front edge of the cover enables a more efficient cooling, and the capacity of the cooling device is thus used more fully. Furthermore, enclosing the cooling device in the cover and arranging the cooling device at least 440 mm inside the cover, i.e. from the front edge of the cover, creates airflow towards the cooling device, and the capacity of the cooling area of the cooling device is thus also used more fully.

In addition, if the cooling device is placed near the front edge of the cover, the air is met with resistance to the flow before entering into the cover. Moreover, the flow is directed away from the cooling device. Hence, placing the cooling device near the front edge of the cover reduces the mass flow through the cooling device.

The mass flow past the cooling device is also reduced if the cooling device is placed near a back edge of the cover. This is due to the flow reversal and negative pressure from the rear side behind the cover.

A further advantage of enclosing the cooling device within the cover is thus that the cover may provide the wind turbine nacelle with a recognisable design, which may be used to identify the manufacturer of the wind turbine.

In one embodiment, the front distance may be at least 600 mm, preferably at least 800 mm, more preferably at least 1000 mm.

Tests have shown that the cooling is more even and efficient when the front distance is at least 600 mm, and still more even and efficient when the front distance is at least 800 mm, and still more even and efficient when the distance is at least 1000 mm.

Furthermore, the front distance may be between 600 and 1400 mm, preferably between 1000 and 1100 mm.

Tests have shown that independent of the height/width ratio of the cooling device, the most even and efficient cooling is obtained when the cooling device is arranged between 600 and 1400 mm from the front edge. The tests have furthermore shown that a front distance between 1000 and 1100 mm is to be preferred independent of the height/width ratio of the cooling device.

In one embodiment, the front edge of the cover may slant towards or away from the cooling device. In addition, the front distance from the slanting front edge of the cover may be a shortest distance between the front edge and the cooling device.

The cover may also have a back edge, the back edge being arranged at a predetermined back distance from the cooling device. The back edge of the cover may also slant towards or away from the cooling device.

In one embodiment, the cover may have two side inner faces and an upper inner face, and the cooling device may be enclosed by the first face of the nacelle and the two side inner faces and the upper inner face of the cover.

When the cover has a substantially square cross-section, a standard cooling device may be used while still maintaining the distance between the cover and the cooling area.

Moreover, the cooling device may extend substantially perpendicular to the first face of the nacelle.

When the cooling device extends substantially perpendicular to the first face of the nacelle, the wind flows towards the cooling device at an angle of approximately 90° to the longitudinal extension of the cooling area, which results in an optimal cooling and thereby an optimal exploitation of the cooling area.

In addition, the inner face of the cover may extend in the longitudinal extension of the nacelle and substantially perpendicular to the cooling device.

The cover is thus able to guide the wind through the cooling device in a steady flow without changing the wind profile unnecessarily.

The cooling device may be a free flow cooling device. In this context, the term "free flow cooling device" is to be understood as a device where no power-driven equipment, such as a fan or the like, is used for leading the wind flow to the cooling device. Furthermore, by using a free flow cooling device the cooling system of the nacelle is more reliable. Also, since the use of fans or the like is avoided less energy consumption is obtained, since less equipment is arranged on the nacelle the loads on the nacelle has been minimized, and by not using fans or the like a reduction in noise has been observed.

In one embodiment, the cooling device may be arranged at a rear distance from a rear end of the wind turbine nacelle, and the rear distance may be at least 15% of a total length of the wind turbine nacelle.

Moreover, the cover may, at least on its inside, have a front part tapering from the front edge towards the cooling device so as to guide air in through the cooling area.

In addition, the cooling device may be adapted to cool one or more wind turbine components, such as a generator, a transformer, a gear box, a frequency converter, etc., which are placed inside the nacelle.

In one embodiment, the cooling device may comprise a cooling medium adapted to exchange heat with the wind. The cooling medium may be water, oil, air, or another suitable media.

In addition, a part of the first face of the nacelle upwind from the cooling device may be substantially without projections so that the airflow before the cooling device is uninterrupted.

In another embodiment, the inner faces of the cover may be substantially without projections.

In addition, the first face may be a top face of the nacelle or a side face of the nacelle. In an embodiment, the nacelle may at least comprise a first face, a second face and a third face, the first face being a top face and the second and third face being side faces.

Also, the nacelle may further comprise a plurality of cooling devices arranged with a mutual distance.

Furthermore, the distance between two cooling devices may be between 20 and 200 mm, preferably between 50 and 150 mm, and even more preferably between 80 and 120 mm.

In one embodiment, one cooling device may be connected to one cooling circuit, and another cooling device may be connected to another cooling circuit.

In another embodiment, a hinge connection may be arranged between at least two cooling devices.

Furthermore, the hinge connection may comprise at least two corrugated metal pipes, the corrugated metal pipes being connected to and extending between the cooling devices, and the corrugated metal pipes preferably being made of stainless steel.

In addition, the cooling circuits may be arranged so that they cool different components in the nacelle, for instance components in the drive train, such as the gearbox.

In another embodiment, the cooling device may be connected to the cover and the first face of the nacelle via at least two connection points, the first connection point being a rigid connection and the second connection point being a flexible connection. In this way, it is obtained that the cooling device may expand or contract due to temperature differences without damaging itself or the cover or nacelle.

Also, the at least two connection points may be made of conductive material. In this way, the cooling device may via its connection points be used as grounding for lightning, etc.

Finally, the invention also relates to a wind turbine comprising a wind turbine nacelle as described above.

BRIEF DESCRIPTION OF THE DRAWINGS

The invention and its many advantages will be described in more detail below with reference to the accompanying schematic drawings, which for the purpose of illustration show some non-limiting embodiments and in which FIG. 6b shows a graph of test results of the reduction in mass flow when the cooling device is displaced in relation to the preferred location as indicated in FIG. 6a.

All the figures are highly schematic and not necessarily to scale, and they show only those parts which are necessary in order to elucidate the invention, other parts being omitted or merely suggested.

DETAILED DESCRIPTION OF THE INVENTION

A wind turbine nacelle 1 is situated on a tower (not shown) and has a front facing a hub in which a plurality of rotor blades (not shown), normally three blades, is fastened. The wind turbine nacelle 1 houses a generator and other equipment used for driving the conversion process of wind energy to electricity—also called the drive train. When producing electricity, the drive train produces a lot of heat, resulting in a less effective conversion process.

In order to cool the equipment and other parts of the nacelle, a cooling device 3 is arranged outside the nacelle 1. Wind flowing along a longitudinal extension of the nacelle flows in through at least one cooling area 4 of the cooling device 3 and cools a fluid within the cooling device 3. The cooled fluid exchanges heat with the parts of the nacelle 1 or equipment to be cooled.

The present invention will mainly be described in connection with an upwind wind turbine, i.e. the nacelle is placed downwind from the wind turbine blades, however, the invention may as well advantageously be implemented in a downwind wind turbine, i.e. the nacelle is placed upwind from the wind turbine blades.

Figure 1:
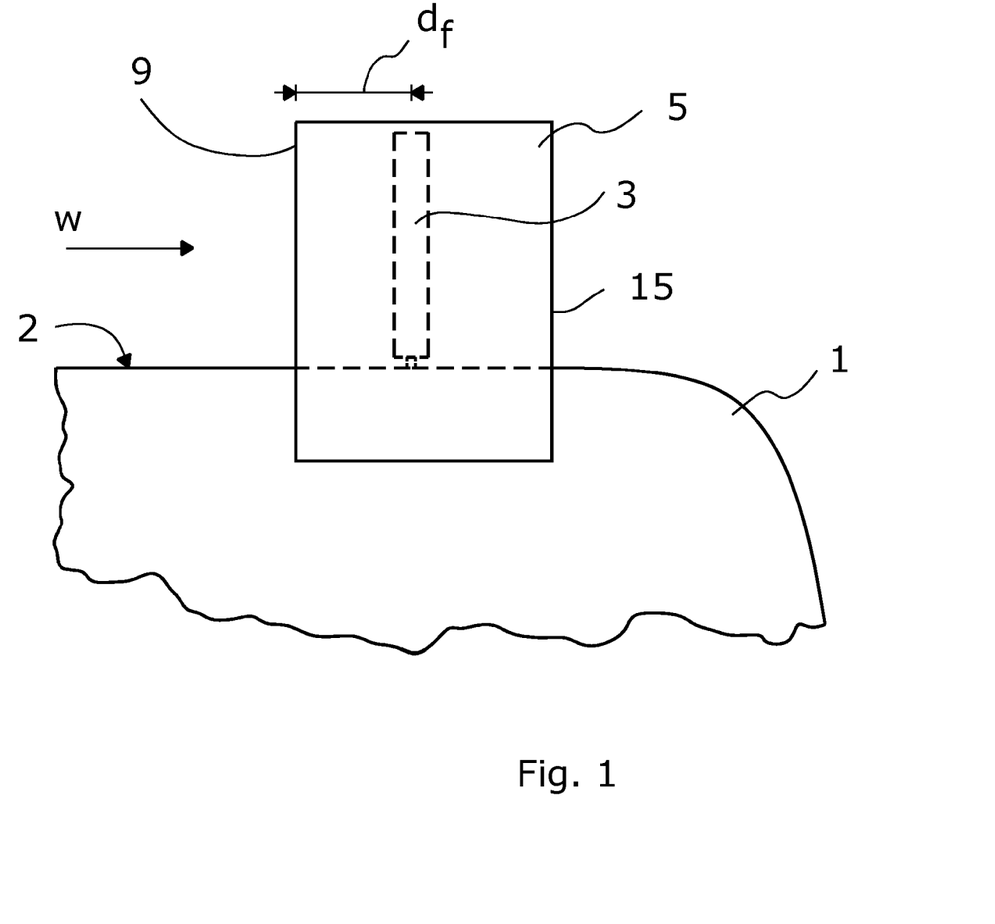
FIG. 1 shows a side view of part of a wind turbine nacelle according to the present invention.

FIG. 1 shows a partial view of the wind turbine nacelle 1 having a first face 2 on which a cooling device 3 is arranged. The cooling device 3 is surrounded and enclosed by a cover 5 extending from the first face 2 of the nacelle 1. As can be seen, the cooling device 3 projects substantially perpendicular to the first face 2 of the nacelle 1. However, in another embodiment, the cooling device 3 may extend from the first face 2 of the nacelle in an angle different from 90° in order to provide a more optimal cooling.

As can be seen in FIG. 1, the cover 5 has a front edge 9. The front edge 9 faces the wind direction, indicated by the arrow w, and is in this embodiment substantially perpendicular to the first face 2. The cover 5 also has a back edge 15.

The cover 5 and thus the inner face 6 of the cover extend in the longitudinal extension of the nacelle 1 and substantially perpendicular to the cooling device 3. However, the cover wall may taper so as to guide the wind into the cooling device 3, or taper from the back edge 15 towards the front edge 9 of the cover.

According to the inventive idea, the cooling device 3 is arranged at a front distance $d_f$ of at least 440 mm from the front edge 9 of the cover 5. The front distance $d_f$ is measured from the front edge 9 of the cover 5 to a middle section of the cooling device 3, which will be further described in connection with FIG. 3 below. However, even though the distance $d_f$ in FIG. 1 is shown from the front edge 9 of the cover to the middle of the cooling device, the distance may also be the distance $d_f$ from the front edge 9 of the cover to the front edge of the cooling device.

The cooling device is surrounded by the cover and the top face of the nacelle. However, the cover is open in front of the cooling device in relation to the wind direction. In this way, the wind flowing freely along the top face of the nacelle can also flow freely under the cover. Furthermore, the cover is open at the back of the cooling device so that the wind can flow through the cooling device and out through the back opening of the cover. Thus, there is no cover in front of or behind the cooling device hindering free flow of the wind. The cover covers only the cooling device at its top and sides.

Figure 2:
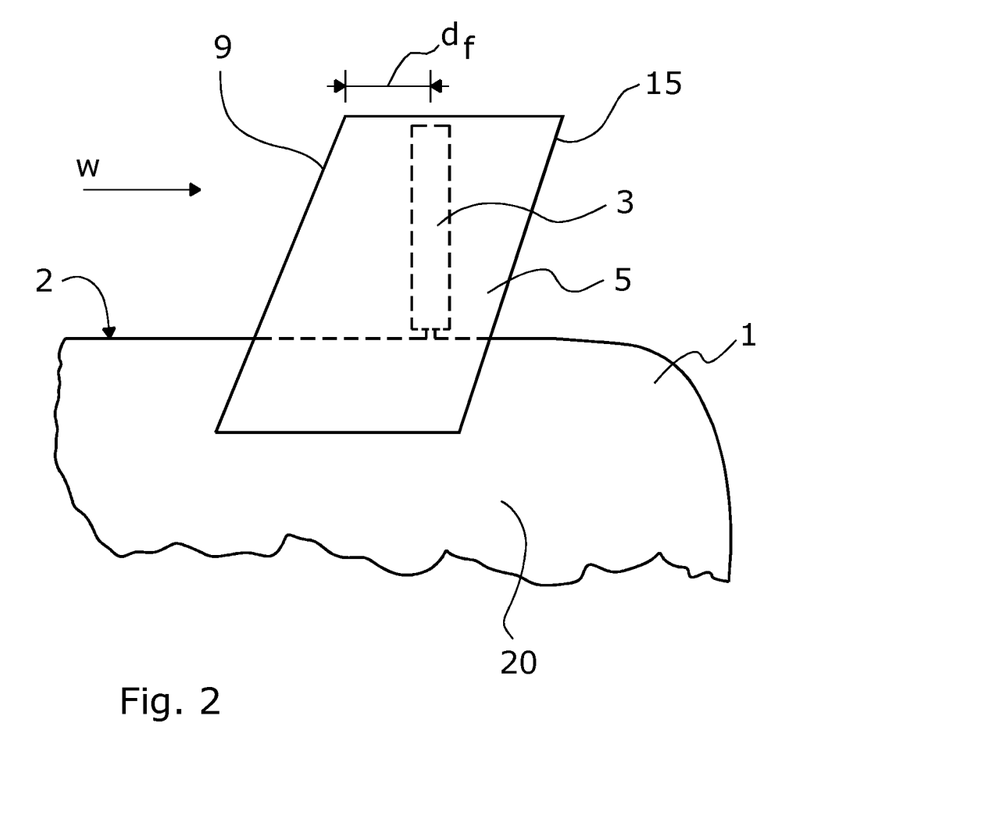
FIG. 2 shows a side view of part of another embodiment of a wind turbine nacelle according to the present invention.

FIG. 2 also shows a partial view of the wind turbine nacelle 1 having a first face 2 on which a cooling device 3 is arranged. The front edge 9 faces the wind direction, indicated by the arrow w, but in this embodiment it is not perpendicular to the first face 2, but somewhat angled in relation to that. Both the front edge 9 and the back edge 15 are angled in this way. It should be noted that the front edge 9 of the cover 5 slants towards the cooling device 3. In another not shown embodiment, the front edge 9 may slant away from the cooling device 3.

In this embodiment, the front distance $d_f$ from the slanting front edge 9 of the cover 5 is a shortest distance between the front edge 9 and the cooling device 3.

Moreover, in this embodiment, the cover 5 extends upwards from the side 20 of the nacelle 1 and crosses over the first face 2 of the nacelle and is fastened in a similar way on the other side of the nacelle 1. Thus, the cover 5 has a roof part extending substantially parallel to the longitudinal extension of the first face 2 of the nacelle 1. In another not shown example, the roof part of the cover 5 might be angled so that it tapers from the back edge 15 of the cover towards the front edge 9 of the cover.

Figure 3:
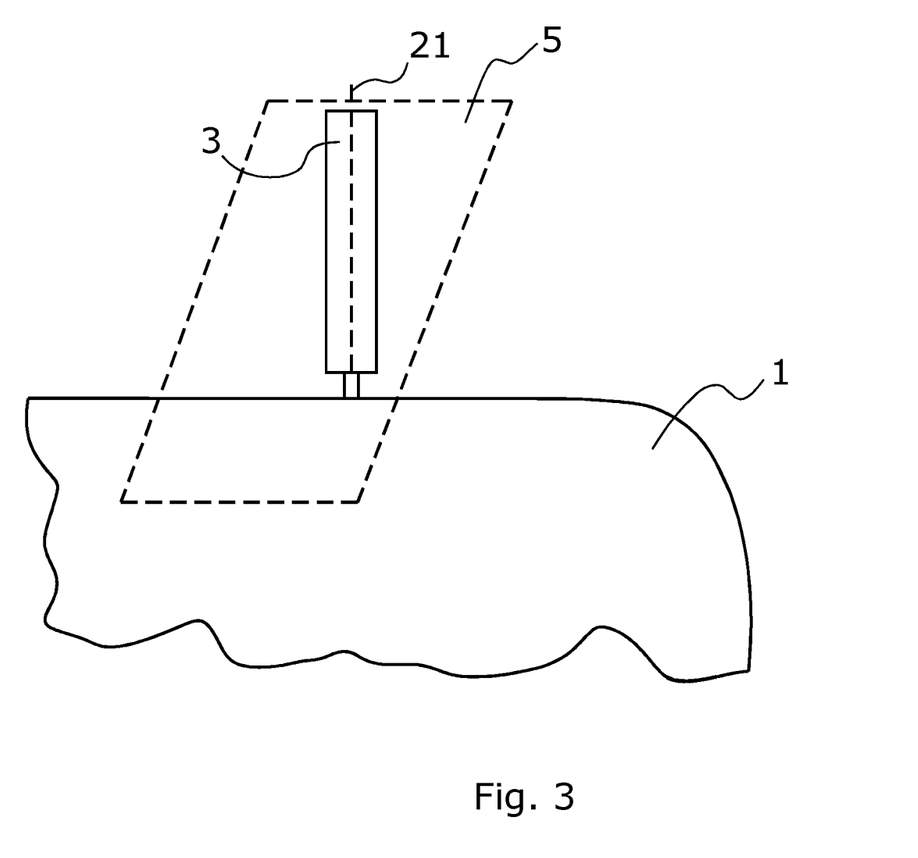
FIG. 3 shows the wind turbine nacelle of FIG. 2 with the cooling device.

FIG. 3 shows the nacelle 1 of FIG. 2 with the cooling device. In this figure, the cover 5 is depicted by a dotted line. The cooling device 3 has a middle section (depicted by the dotted line 21) in the longitudinal extension of the nacelle 1. It is from this middle section that the front distance $d_f$ is measured in this embodiment.

Figure 4:
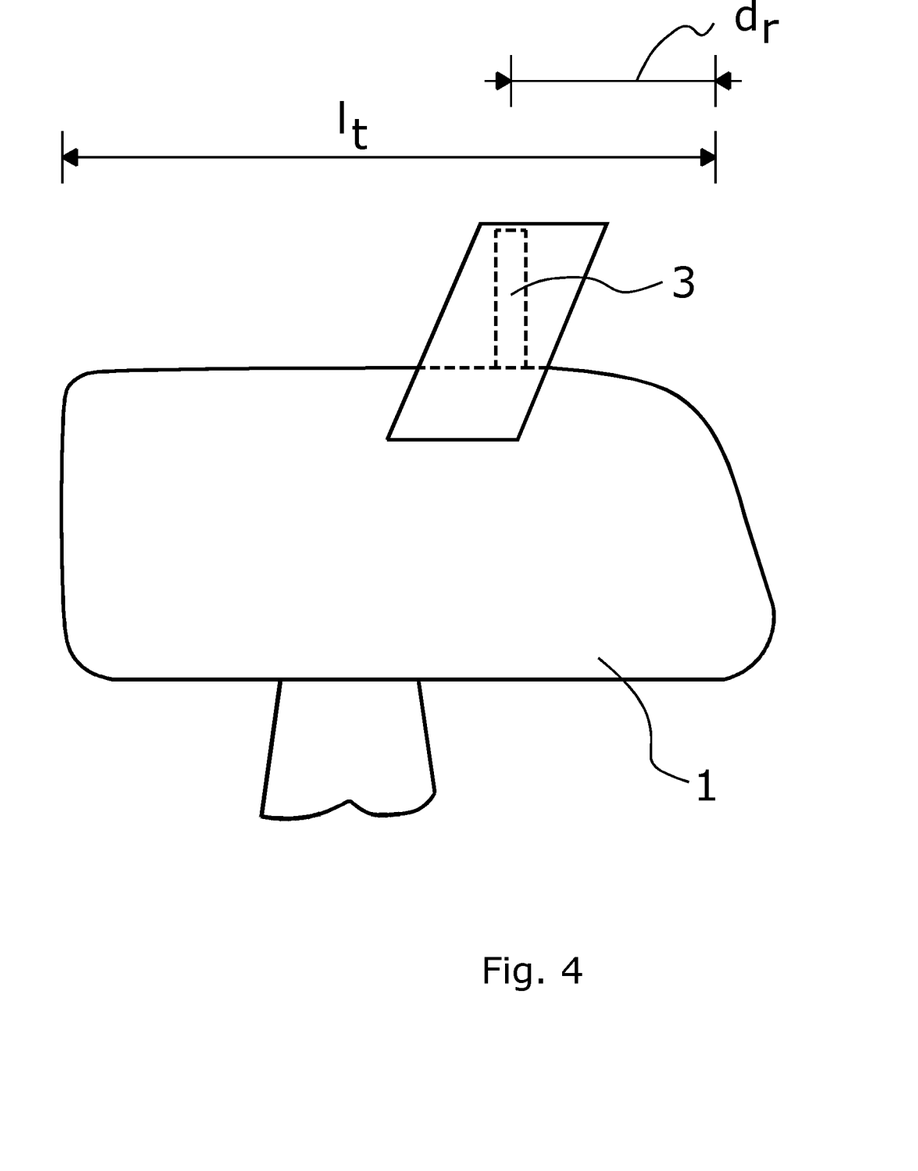
FIG. 4 shows a schematic side view of a wind turbine nacelle with a cover.

FIG. 4 shows an entire wind turbine nacelle 1 schematically. The nacelle 1 has an overall length l, and the cooling device 3 is arranged at a rear distance $d_r$ from the rear of the nacelle 1, e.g. a rear distance $d_r$ of at least 15% of the overall length l of the nacelle 1 measured without the hub, preferably at least 30%.

In another not shown embodiment, the cooling device 3 and the cover 5 are arranged just above the end part of the nacelle 1 so that the back edge 15 of the cover extends beyond the outermost part of the end of the nacelle.

The cover 5 of FIGS. 1-4 is fastened to the side of the wind turbine nacelle 1 and extends perpendicular to the side of the wind turbine nacelle before extending upwards and parallel to the side of the wind turbine nacelle resulting in the creation of a space (not shown) between the side of the nacelle and the inner face 6 of the cover.

By fastening the cover 5 to the side of the wind turbine nacelle 1, the wind profile of the wind flowing along the first face 2 of the nacelle is not changed. Furthermore, the cover 5 is able to cover any elements which do not have the right aesthetic appearance.

In one embodiment, the cover 5 may be designed so that the inner face 6 and thus a front part (not shown) of the cover taper towards the cooling device 3. In this embodiment, an outside wall of the cover 5 is kept straight, meaning that the form of the outside wall remains unchanged and that the cover 5 of the wind turbine nacelle 1 thus still appears a smooth, unbroken surface. In this way, wind is guided in under the cover and through the cooling area.

In another embodiment, the front part (not shown) of the cover 5 also tapers towards the cooling device 3. However, in this embodiment, the wall of the front part of the cover 5 tapers towards the cooling device 3, and the cover 5 is thus able to guide the wind in under the cover and through the cooling area.

Wind is guided in under the cover 5 due to the fact the cover, together with the first face 2 of the wind turbine nacelle 1, encloses the cooling device 3.

In the embodiments described above, the cover 5 is fastened to the first part of the wind turbine nacelle 1. However, in another embodiment, the cover 5 may be fastened further down the sides of the wind turbine nacelle 1. It may even be fastened near the bottom of the nacelle 1, and may also at least partly enclose the bottom of the wind turbine nacelle.

The rear part of the wind turbine nacelle 1 may have any kind of shape. Thus, it may be round, upwardly or downwardly inclined, or be a vertically straight face so that the end face is perpendicular to the longitudinal extension of the wind turbine nacelle 1.

For the purpose of illustration, the form of the nacelle 1 has merely been sketched. In reality, the nacelle is usually highly aerodynamic in shape and may have rounded corners instead of appearing as a square box. Furthermore, the sides of the nacelle may be concave or convex.

In addition, the first face 2 and a bottom face of the wind turbine nacelle 1 may taper towards the hub or towards the rear part of the nacelle.

Figure 5:
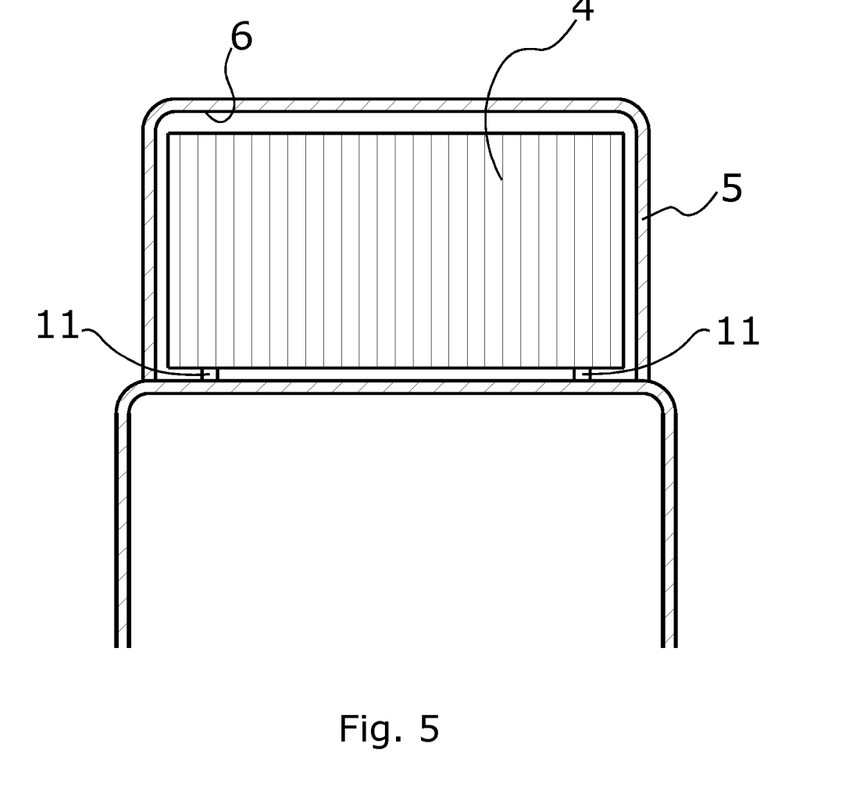
FIG. 5 shows part of a cross-sectional view of the wind turbine nacelle and the cover.

FIG. 5 shows a partly cross-sectional view of the cover 5 and the first part of the wind turbine nacelle 1. The cooling device 3 is arranged on top of the wind turbine nacelle 1 and the fluid for cooling parts of the wind turbine nacelle or the equipment inside runs in tubing in the cooling area 4. The cooling device 3 is connected with the nacelle 1 through two tube connections 11 in which the tubing runs.

The above-mentioned cooling device 3 may be any kind of cooler, heat sink, or heat exchanger where a first fluid, such as the wind, cools a second fluid, such as a coolant, a refrigerant, or the like fluid. In a preferred embodiment, the cooling device 3 is a free flow cooler, i.e. a heat sink through which the wind surrounding the cooling area 4 passes freely and in that way cools the fluid flowing within the tubing of the cooling device without any assisting help, i.e. fans etc.

The nacelle may also comprise a plurality of cooling devices arranged side by side to form one cooling surface. The cooling devices may be connected to the cooling system as a series or parallel circuit. One cooling device may be connected to one cooling circuit cooling some elements in the drive train, and another cooling device may be connected to another cooling circuit cooling another section of elements in the drive train. The cooling devices may be connected by means of valves which can fluidly disconnect two cooling devices so that they form part of two separate cooling circuits whereby they can cool separate elements or sections in the nacelle.

The cooling devices may also be arranged with a mutual distance creating a space between them so that wind can flow between two cooling devices in this space. The distance between two cooling devices may be between 20 and 200 mm, preferably between 50 and 150 mm, and even more preferably between 80 and 120 mm.

In addition, the cooling device may be connected to the cover and the first face of the nacelle via at least two connection points, the first connection point being a rigid connection and the second connection point being a flexible connection. The rigid connection may be some kind of metal bracket being secured to the cover and extending downwards towards the cooling device. The cooling device may then be mounted on the metal bracket, for instance via a bolt connection. The flexible connection may for instance be some kind of corrugated metal sheet or strip which is at one end connected to the nacelle and at the other end connected to the cooling device via for instance a bolt connection. The corrugated metal sheet is then able to absorb any expansion or retraction of the cooling device so that neither the cooling device nor the cover or nacelle are damaged.

Advantageously, the connection points are made of conductive material, such as metal, meaning that they may also be used for leading high current from a lightning to the ground and thereby be a part of the wind turbines lightning protection system.

Furthermore, the cover 5 may have any kind of shape. Even though the cover 5 is primarily shown as having a partly square cross-section with rounded corners, the cover may have more than three sides, e.g. seven sides.

Tests have shown that the cooling is more even and efficient when the front distance $d_f$ is at least 600 mm, and still more even and efficient when the front distance $d_f$ is at least 800 mm, and still more even and efficient when the distance $d_f$ is at least 1000 mm.

Further tests have shown that independent of the height/width ratio of the cooling device 3, the most even and efficient cooling is obtained when the cooling device is arranged between 600 and 1400 mm from the front edge. The tests have furthermore shown that a front distance between 1000 and 1100 mm is to be preferred independent of the height/width ratio of the cooling device 3.

The tests were performed by positioning a cooling device 3 inside a cover 5 and by using a wind tunnel kind approach for identifying the optimum position of the cooling device inside the cover in view of mass flow through the cooling device. The tests were performed with an inlet wind speed of 14 m/s and the mass flow was measured at different front distances.

Figure 6A:
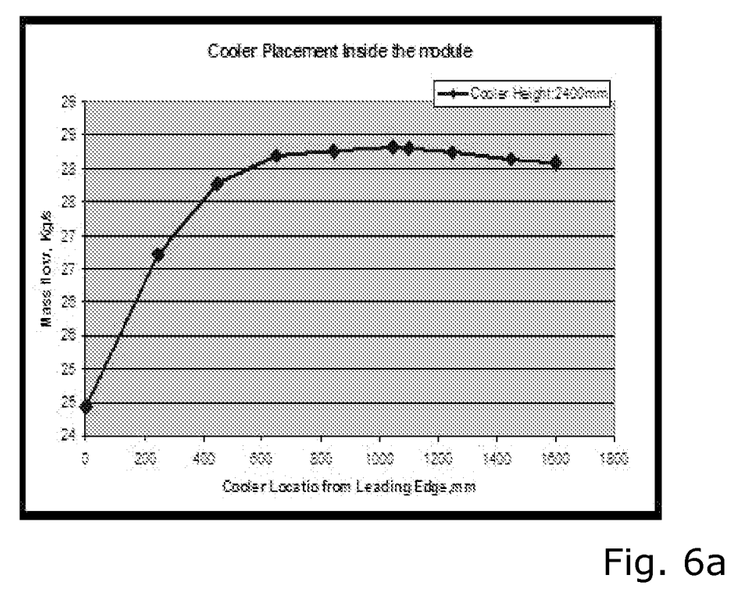
FIG. 6a shows a graph of test results of mass flow in different positions of one embodiment of a cooling device from the front edge of the cover.

FIG. 6a shows a graph of test results of mass flow in different positions of a cooling device 3 from the front edge of the cover 5. In this test, the cooling device had a height of 2400 mm and a width of 2237 mm. From FIG. 6a, it may thus be deduced that the optimum location of the cooling device 3 from the front edge of the cover 5 is around 1050 mm.

Figure 6B:
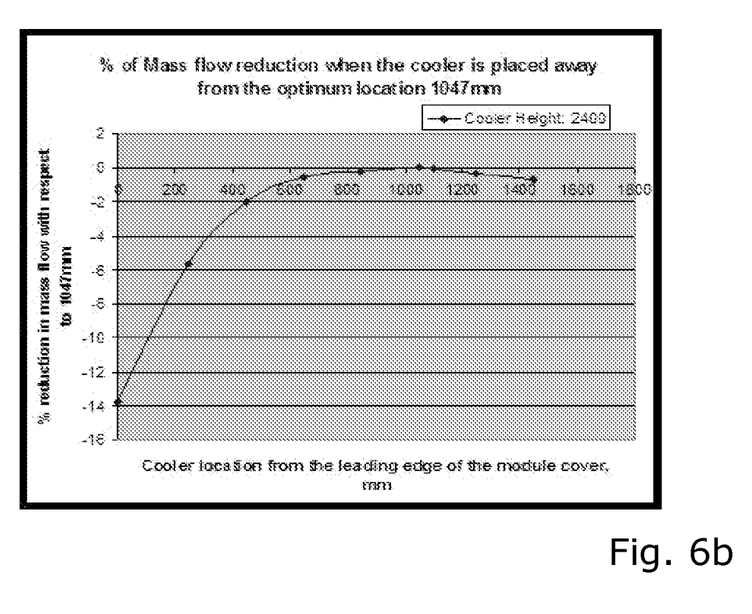

FIG. 6b shows a graph of test results of the reduction in mass flow when the cooling device 3 is displaced in relation to the preferred location as indicated in FIG. 6a. It may thus be deduced that a reduction in the mass flow rate of no more than approximately 2% will be observed if the cooling device 3 is placed between 440 mm and 1600 mm from the front edge of the cover 5.

Several additional tests were conducted with cooling devices 3 having heights of 1400 mm, 1600 mm, and 1800 mm, respectively, as well as widths of 2237 mm and 2437 mm, respectively. All the tests showed that the optimum location of the cooling device 3 was around 1050 mm from the front edge of the cover 5, and substantially no reduction in mass flow rate was observed for locations of the cooling devices between 400 mm and 1600 mm. Thus, the tests have shown that, independent of the height/width ratio of the cooling device 3, the most even and efficient cooling is obtained when the cooling device is located between 1000 and 1100 mm from the front edge of the cover 5.

By wind turbine is meant any kind of apparatus able to convert wind power into electricity, such as a wind generator, wind power unit (WPU), or wind energy converter (WEC).

Although the invention has been described in the above in connection with preferred embodiments of the invention, it will be evident for a person skilled in the art that several modifications are conceivable without departing from the invention as defined by the following claims.

The invention claimed is:

1. A wind turbine nacelle having a first exterior face with a longitudinal extension in a wind direction, comprising:
    a cooling device having a cooling area, extending outwardly from the first face of the nacelle, and being directly exposed to ambient wind flow, and
    a cover having at least one inner face and at least a front edge facing the wind direction, the cooling device being enclosed by the first face of the nacelle and the inner face of the cover, wherein the cooling device is arranged at a front distance of at least 440 mm from the front edge of the cover.

2. The wind turbine nacelle according to claim 1, wherein the front distance is at least 600 mm.

3. The wind turbine nacelle according to claim 1, wherein the front distance is between 600 and 1400 mm.

4. The wind turbine nacelle according to claim 1, wherein the cover has two side inner faces and an upper inner face and the cooling device is enclosed by the first face of the nacelle and the two side inner faces and the upper inner face of the cover.

5. The wind turbine nacelle according to claim 1, wherein the cooling device extends substantially perpendicular to the first face of the nacelle.

6. The wind turbine nacelle according to claim 1, wherein the inner face of the cover extends in the longitudinal extension of the nacelle and substantially perpendicular to the cooling device.

7. The wind turbine nacelle according to claim 1, wherein the cooling device is free flow cooling device.

8. The wind turbine nacelle according to claim 1, wherein the cooling device is arranged at a rear distance from a rear end of the wind turbine nacelle, the rear distance being at least 15% of a total length of the wind turbine nacelle.

9. The wind turbine nacelle according to claim 1, wherein the cover has a flange projecting in an angle from the inner face, decreasing an opening defined by the first face and the inner face.

10. The wind turbine nacelle according to claim 1, further comprising a plurality of cooling devices arranged with a mutual distance, wherein the distance between two cooling devices is between 20 and 200 mm.

11. A wind turbine comprising a wind turbine nacelle according to claim 1.

12. The wind turbine nacelle according to claim 1, wherein the cover has two side inner faces and an upper inner face, and the cooling device is enclosed by the first face of the nacelle and the two side inner faces and the upper inner face of the cover, wherein the cooling device extends substantially perpendicular to the first face of the nacelle, and wherein the inner face of the cover extends in the longitudinal extension of the nacelle and substantially perpendicular to the cooling device.

13. A wind turbine nacelle having a first face with a longitudinal extension in a wind direction, comprising:
    a cooling device having a cooling area and extending from the first face of the nacelle, and
    a cover having at least one inner face and at least a front edge facing the wind direction, the cooling device being enclosed by the first face of the nacelle and the inner face of the cover, wherein the cooling device is arranged at a front distance of at least 440 mm from the front edge of the cover,
    further comprising a plurality of cooling devices arranged with a mutual distance, wherein the distance between two cooling devices is between 20 and 200 mm, wherein a hinge connection is arranged between at least two cooling devices.

14. The wind turbine nacelle according to claim 13, wherein the hinge connection comprises at least two corrugated metal pipes, the corrugated metal pipes being connected to and extending between the cooling devices, and the corrugated metal pipes preferably being made of stainless steel.

15. A wind turbine nacelle having a first face with a longitudinal extension in a wind direction, comprising:
  a cooling device having a cooling area and extending from the first face of the nacelle, and
  a cover having at least one inner face and at least a front edge facing the wind direction, the cooling device being enclosed by the first face of the nacelle and the inner face of the cover, wherein the cooling device is arranged at a front distance of at least 440 mm from the front edge of the cover,
  wherein the cooling device is connected to the cover and the first face of the nacelle via at least two connection points, the first connection point being a rigid connection and the second connection point being a flexible connection.

16. The wind turbine nacelle according to claim 15, wherein the at least two connection points are made of conductive material.

* * * * *

UNITED STATES PATENT AND TRADEMARK OFFICE
CERTIFICATE OF CORRECTION

| | | |
|---|---|---|
| PATENT NO. | : 9,074,582 B2 | Page 1 of 1 |
| APPLICATION NO. | : 13/146577 | |
| DATED | : July 7, 2015 | |
| INVENTOR(S) | : Krishnamoorthi Sivalingam et al. | |

It is certified that error appears in the above-identified patent and that said Letters Patent is hereby corrected as shown below:

In the Specification:

At column 2, line number 61, change "has" to --have--

At column 3, line number 21, change "face" to --faces-- (third instance)

In the Claims:

At column 8, claim number 7, line number 31, after "is" insert --a--

Signed and Sealed this
Twenty-second Day of December, 2015

Michelle K. Lee
*Director of the United States Patent and Trademark Office*